Patented Apr. 26, 1949

2,468,078

UNITED STATES PATENT OFFICE 2,468,078

SALTED NUTS AND PROCESS FOR MAKING THE SAME

William W. Kelly, Shaker Heights, Ohio

No Drawing. Application April 26, 1944,
Serial No. 532,873

4 Claims. (Cl. 99—127)

This invention relates to the art of salted nuts and the process of producing the same, including peanuts and other nuts that are referred to in the trade as fancy nuts. In referring to nuts, I have in mind the nuts after having been shelled.

Heretofore, in the preparation of salted nuts, it has been the universal practice to place the shelled nuts in a wire basket and then to submerge them in a pot of vegetable oil at a temperature of from 300 to 350 degrees Fahrenheit, the nuts remaining in the hot oil until they acquire a golden brown color, which usually requires from twelve to eighteen minutes per batch. Then the nuts are removed from the oil, the oil is drained off of the nuts which are then spread out and to which salt is added while they are stirred so as to obtain a uniform coating of salt upon all of the nuts. As the hot nuts readily absorb the oil during the first part of this process, a dressing of cold oil is generally applied to the nuts when cooled so as to afford a means for causing the salt to adhere to the nuts and also to give the nuts a shiny appearance.

This old process possesses several very objectionable features. As a result of cooking the nuts in oil, they will absorb so much of the oil that their natural flavor is lost to a very large extent. Furthermore, the absorption of the oil by the nuts during the cooking of the same, will render them decidedly soggy; and this condition is further aggravated by the moisture which is later picked up by the salt and absorbed by the nuts. The loss of the natural flavor of the nuts and their lack of a crispy condition renders them rather undesirable in the trade.

Another serious objection to the previously practiced process resides in the fact that it entails a fire hazard when performed in the retail stores; and, for this reason, it is usually performed in the factory and the finished product shipped to the retail stores. Although thermostats are employed as a means of controlling the temperature of the oil in this old process, yet there still remains the danger of flashing of the vegetable oil. Because of the fire hazard, many stores will not permit this old process to be performed upon the store premises.

In carrying out this old process, in the retail store, there is produced an objectionable odor which seems to penetrate many other articles in the store; and for this reason also this old process has come into disfavor in many stores.

Also, this old process requires the use of a comparatively large quantity of vegetable oil, the absorption of the oil by the nuts being from about three and one-half pounds of oil for one hundred pounds of nuts, depending upon the amount of moisture in the nuts. In the case of peanuts, for instance, the quantity of oil required is about three times that of the peanuts being prepared.

Accordingly, it is the object of the present invention to eliminate all of the several objectionable features of the old process, as above noted, and as will more fully appear from the following.

More specifically, one object is to dry-roast the nuts and then seal them so as to preserve them in such dry, crisp condition.

Another object is to apply salt to the nuts after they have been dry-roasted and sealed in such dry condition.

A further object is to apply salt to the nuts after they have been dry-roasted and sealed in such dry condition and also while the nuts are in a cooled condition.

A further object is to apply salt to the nuts and to cause the same to adhere thereto by means of a suitable agent that is applied with the salt to the nuts after they have been dry-roasted and sealed in such dry-roasted condition.

Another object is to devise a process of preparing salted nuts, according to which the necessity of applying heat to the nuts in the retail store may be eliminated, and which will encourage the salting of nuts in the home as well as in the store.

Another object is to devise a process whereby there may be obtained a salted nut in crisp condition and with its natural flavor.

A further object is to devise a process that will entail a saving in the cost of producing salted nuts, with respect to both labor and materials.

A still further object is to devise a process of preparing salted nuts that will eliminate the objectionable odor that has accompanied the old process above referred to.

Other objects will appear from the following description and claims.

It is to be understood that the present form of disclosure is merely for the purpose of illustration and that there might be devised various modifications thereof without departing from the spirit of my invention as herein set forth and claimed.

According to my present improved process, the shelled nuts are tumbled in a rotating roaster in which heat is circulated at from four hundred and fifty to five hundred degrees Fahrenheit, until they acquire a light, golden brown color which indicates that all moisture has been expelled from the nuts. This is known as "dry-roasting." Then, while the roasted nuts are still being tumbled in the roaster at a high temperature, a solution of gum arabic, casein or any other suitable sealing agent is sprinkled over the nuts; and thus each nut becomes uniformly coated with a sealing agent that is impervious to moisture and will thus preserve the nuts in their crispy or crunchy condition and with their natural flavor. During this step, the presence of heat will drive off any moisture in the sealing solution; and the resultant coating upon the nuts will seal therewithin their good qualities and repel the entrance of moisture or any other undesirable elements from the outside.

Then the nuts are removed from the roasting tumbler, they are cooled and placed in containers, either tin, glass or fibre, and are ready for sale to the retail store or the home. Whenever desired, the nuts may be removed from their container and placed in a suitable receptacle and stirred with vegetable oil or melted butter while at the same time salt is sprinkled over the nuts; or the nuts may be placed in a wire or perforated metal basket and dipped in a liquid oil, the salt being then sprinkled upon the nuts while stirring the same immediately following the oil bath. The vegetable oil or melted butter is added for the purpose of causing the salt to adhere to the nuts and there will be used only sufficient quantity of one of these ingredients for this purpose. My experience shows that about one ounce of vegetable oil or melted butter and two ounces of salt are sufficient for five pounds of nuts when treated in the manner contemplated by my present process.

As a result of this improved process, the sealed condition of the nuts prevents their absorption of the oil or butter or moisture that might be picked up by the salt. Thus the nuts still retain their natural flavor and are not soggy but are preserved in their crisp or crunchy, freshly roasted condition.

There is eliminated all fire hazard in the retail store or in the home since there is required no heat at all in either place for the salting of the nuts as received by them. Hence this process overcomes the former sales resistance upon the part of the retail merchants because of the fire hazard and now too the ultimate consumer can salt the nuts as required for immediate use.

My present process means a saving in the quantity of materials required and hence is less costly in the production of a much more satisfactory result as compared with the old process above referred to.

Since my present process requires but a comparatively small quantity of oil or butter in the application of the salt, it will be very practical and much more advantageous to use a fresh supply of oil or butter for each batch of roasted nuts; and there is precluded the objection of rancid oil or butter which results from using it over and over again in the old process above referred to.

Furthermore, my present improved process entails the expenditure of less time and labor than in the old process mentioned; and the quickness with which the nuts can be salted by my process, makes it very feasible and advantageous for the ultimate consumer to perform the salting step of the process in the home and at the time when the salted nuts are desired.

Whereas the old process requires from twelve to eighteen minutes for roasting each batch of nuts in oil, the only treatment required to be performed in the retail store or in the home, takes only a minute or so. Furthermore, in the old process production depends upon the size of the cooker whereas any quantity of the roasted nuts can be salted at one time and in a comparatively short time with my process.

Thus the preparation of salted nuts is much simpler, faster and more economical with my process as compared with the old process; and the product of my process is much more desirable to the consumer and hence more salable by the retail merchant.

Other practical advantages resulting from my present process will no doubt be obvious to those who are familiar with the art to which this invention relates.

What I claim is:

1. The process of preparing salted nuts, consisting in roasting shelled raw nuts under dry condition so as to expel all moisture quickly therefrom, applying a moisture-repellant coating to only the outer surface of each nut under substantially moisture-free condition so as to provide at once a moisture-proof coating upon the nuts and thereby preserve their freshness, flavor and crispness, cooling the nuts, applying an edible coating to the nuts, and applying salt to only the outer surface of the edible coating.

2. The process of preparing salted nuts, consisting in roasting shelled raw nuts under dry condition so as to expel all moisture quickly therefrom, applying a moisture-repellant sealing coating, substantially in the absence of moisture, to only the outer surface of each nut while the nuts are substantially free of moisture and while still hot so as to repel any moisture and provide at once a moisture-proof coating upon the nuts and thereby preserve their crisp condition, freshness and natural flavor, and applying salt to only the outer surface of the coating upon the nuts.

3. A dry-roasted shelled nut having a coating of a suitable moisture-free and moisture-repellant agent applied to only the outer surface thereof to seal the same in moisture-free condition and thereby preserve the crisp condition, freshness and natural flavor thereof, an edible coating upon only the outer surface of said moisture-repellant agent, and a suitable coating of salt adhering to only said last-named coating.

4. A dry-roasted shelled nut having a coating of a suitable moisture-free and moisture-repellant agent applied to only the outer surface thereof to seal the same in moisture-free condition and thereby preserve the crisp condition, freshness and natural flavor thereof, and a suitable coating of salt applied to only the outer surface of the coating upon the nut.

WILLIAM W. KELLY.

REFERENCES CITED

The following references are of record in the file of this patent:

UNITED STATES PATENTS

| Number | Name | Date |
|---|---|---|
| 1,307,090 | Dunham | June 17, 1919 |
| Re. 15,902 | Zaloom | Aug. 26, 1924 |
| 1,602,826 | Kuhn | Oct. 12, 1926 |
| 1,914,638 | Herstein | June 20, 1933 |
| 1,972,443 | Halabi | Sept. 4, 1934 |
| 2,020,533 | Zaloom | Nov. 12, 1935 |
| 2,026,813 | Bizell | Jan. 7, 1936 |
| 2,218,713 | Kelly et al. | Oct. 22, 1940 |